(12) United States Patent
Mach et al.

(10) Patent No.: US 12,400,141 B2
(45) Date of Patent: Aug. 26, 2025

(54) PAYMENT AUTHORIZATION VIA MACHINE LEARNING

(71) Applicant: Google LLC, Mountain View, CA (US)

(72) Inventors: Mateusz Waldemar Mach, Sunnyvale, CA (US); Mark Damien Walick, Sunnyvale, CA (US); Brian Wesley Goldman, Erie, CO (US); John P. Kozura, Boulder, CO (US); Daniel Jeng, Sunnyvale, CA (US); Paul Copenhaver, Fayetteville, CO (US); Ridhima Kedia, Mountain View, CA (US); Jett Wilson Rink, Broomfield, CO (US); Sarat Chandra Tummala, Hayward, CA (US)

(73) Assignee: GOOGLE LLC, Mountain View, CA (US)

( * ) Notice: Subject to any disclaimer, the term of this patent is extended or adjusted under 35 U.S.C. 154(b) by 1151 days.

(21) Appl. No.: 17/078,638

(22) Filed: Oct. 23, 2020

(65) Prior Publication Data

US 2021/0125179 A1    Apr. 29, 2021

Related U.S. Application Data

(60) Provisional application No. 62/926,106, filed on Oct. 25, 2019.

(51) Int. Cl.
*G06Q 20/40* (2012.01)
*G06F 18/21* (2023.01)
(Continued)

(52) U.S. Cl.
CPC .......... *G06N 20/00* (2019.01); *G06F 18/214* (2023.01); *G06F 18/217* (2023.01); *G06N 7/01* (2023.01); *G06Q 20/401* (2013.01)

(58) Field of Classification Search
CPC ........ G06N 20/00; G06N 7/01; G06F 18/217; G06F 18/214; G06Q 20/401
See application file for complete search history.

(56) References Cited

U.S. PATENT DOCUMENTS 10,915,900 B1 *   2/2021   Higgins ................. G06N 20/00
11,176,558 B1 *   11/2021  Cohn ................... G06Q 20/102
(Continued)

*Primary Examiner* — Beau D Spratt
(74) *Attorney, Agent, or Firm* — DORITY & MANNING P.A.

(57) ABSTRACT

Computing systems and methods can use machine learning to improve the authorization of payments by payment systems. Specifically, contrary to existing payment authorization approaches which are static in nature, example aspects of the present disclosure are directed to machine learning systems which enable the dynamic and real-time optimization of one or more variable request parameters associated with a payment authorization request. Specifically, example computing systems described herein can employ one or more machine-learned models to assist in selection of a particular payment processor to which the authorization request is routed, optimization of one or more variable message parameters included in the authorization message (e.g., selection of values for a merchant identification, a merchandise category code, a transaction type, and/or other variable message parameters), and/or automatic generation and/or execution of an automated retry strategy that can be executed if a first authorization request is declined.

20 Claims, 8 Drawing Sheets

(51) Int. Cl.
*G06F 18/214* (2023.01)
*G06N 7/01* (2023.01)
*G06N 20/00* (2019.01)

(56) References Cited

U.S. PATENT DOCUMENTS

| | | | |
|---|---|---|---|
| 2016/0364724 A1* | 12/2016 | Wang | G06Q 20/405 |
| 2018/0025354 A1* | 1/2018 | Groarke | G06Q 20/382 |
| | | | 705/44 |
| 2018/0174137 A1* | 6/2018 | Subbarayan | G06Q 50/01 |
| 2019/0332706 A1* | 10/2019 | Leon | G06Q 20/35765 |
| 2019/0362352 A1* | 11/2019 | Kumawat | G06Q 20/227 |
| 2019/0392441 A1* | 12/2019 | Lee | G06N 20/00 |
| 2020/0005270 A1* | 1/2020 | Griffith | G06Q 20/20 |
| 2020/0134628 A1* | 4/2020 | Jia | G06N 20/00 |
| 2022/0405580 A1* | 12/2022 | Zheng | G06F 18/24147 |

\* cited by examiner

PAYMENT AUTHORIZATION VIA MACHINE LEARNING

RELATED APPLICATIONS

This application claims priority to and the benefit of U.S. Provisional Patent Application No. 62/926,106 filed Oct. 25, 2019. U.S. Provisional Patent Application No. 62/926,106 is hereby incorporated by reference in entirety.

FIELD

The present disclosure relates generally to facilitating payments between a customer and a merchant. More particularly, the present disclosure relates to systems and methods that use machine learning to perform improved routing of payment authorization requests.

BACKGROUND

A payment system can be used to facilitate a payment from one party to another party through the transfer of monetary value. One example type of payment system is an operational network that links various accounts (e.g., bank accounts, debit accounts, credit accounts, online monetary accounts, etc.) and facilitates monetary exchange via the electronic transfer of monetary value among such accounts.

As one example use of a payment system, a customer may seek to perform a payment to a merchant (e.g., in exchange for goods or services). The customer may be physically located at the merchant's place of business (e.g., storefront) or may be electronically shopping (e.g., on a website operated by or otherwise associated with the merchant). The customer can provide a form of payment (e.g., a credit card, debit card, etc.) to perform the payment.

The merchant can attempt to process the payment. Specifically, in some examples, a payment routing system (e.g., which may be referred to in some instances as a "payment gateway" or simply "gateway") can facilitate a payment authorization request to a payment processor (which in some instances is referred to as an acquiring bank or simply "acquirer") associated with the merchant. As one example, the payment routing system can be part (e.g., embodied in software and configuration settings) of an e-commerce system that processes online transactions associated with the merchant.

The payment processor can transmit (e.g., via one or more payment networks) the authorization request to an issuing bank (also known simply as an "issuer") that issued the form of payment. For example, in the case of a credit card, the communication from the payment processor to the issuing bank can be handled via an intermediate credit network (e.g., Visa) which may also be referred to as "credit rails." The issuing bank can authorize or decline the payment (e.g., based on an analysis of the payment authorization request) and the authorization outcome can be communicated back to the merchant for use in completing/accepting the transaction. Thereafter (e.g., at the end of the day) various accounts can be settled to complete the transfer of monetary value (e.g., from the customer's account to the merchant's account).

However, the approach described above has a number of drawbacks. As one example, existing payment routing systems are static in their logic for generating the payment authorization request. For example, many merchants have a single payment processor that takes a transaction event and sends it to the merchant's only issuing bank. Therefore, a merchant's integration to a single payment processor and the coded authorization message used is static in its logic for generating the payment authorization request.

Thus, most of existing payment routing systems generate payment authorization requests that consistently contain the same static values for various portions of the authorization request (e.g., merchant ID, transaction type, category code, currency type, etc.) and/or employ the same static routing for the authorization request (e.g., use the same static payment processor). If the payment is not authorized, then the customer is simply asked to retry (e.g., using the same values within the authorization request and/or the same payment processor) or to provide an alternative form of payment. Stated differently, the customer typically does not have any influence on how the transaction is going to be routed. Instead, because their gateway is static in nature, the merchant will continue to use the same values as before.

This static approach leads to a significant number of otherwise potentially valid payment requests being declined, resulting in lost revenue and customer satisfaction. An analysis of declined payment authorizations indicates that a significant portion of the declined payment authorization requests would have been authorized if different values for various portions of the authorization request and/or a different payment processor were used.

As a result of having the payment request declined, many customers will retry using the same or an alternative form of payment. Thus, in such scenarios, multiple unneeded network communications must occur to facilitate the payment, resulting in unnecessary consumption of computing resources such as redundant payment network usage and cost to the merchant for subsequent attempts. In addition, a significant portion of customers who have their initial payment request declined choose not to retry, resulting in lost sales for the merchant and dissatisfaction for the customer.

Furthermore, a declined authorization request has significant negative downstream consequences and feedback effects (i.e., a declined authorization request has effects beyond just the single request failure and/or prompting of a retry). Specifically, one or more declined authorization requests can trigger additional fraud screening or otherwise stricter analysis from networks and/or issuers, thereby negatively impacting the likelihood of success for future authorization payment requests.

SUMMARY

Aspects and advantages of embodiments of the present disclosure will be set forth in part in the following description, or can be learned from the description, or can be learned through practice of the embodiments.

One example aspect of the present disclosure is directed to a computing system configured to facilitate authorization of payments. The computing system includes one or more computer processors and one or more non-transitory computer-readable media that collectively store a machine-learned payment success prediction model configured to predict success probabilities for payment authorization requests. The one or more non-transitory computer-readable media collectively store instructions that, when executed by the one or more computer processors, cause the computing system to perform operations. The operations include obtaining payment data that describes a proposed payment from a customer to a merchant. The operations include identifying a plurality of candidate authorization requests for the proposed payment, each of the plurality of candidate authorization requests having a different combination of values for one or more variable request parameters. The operations include determining, as an output of the machine-learned payment success prediction model, a respective success probability for each of the plurality of candidate authorization requests. The operations include selecting one or more of the plurality of candidate authorization requests as one or more selected authorization requests based at least in part on the respective success probability for each of the plurality of candidate authorization requests output by the machine-learned payment success prediction model.

Another example aspect of the present disclosure is directed to a computer-implemented method to train a machine-learned payment success prediction model to predict success probabilities for payment authorization requests. The method includes obtaining, by one or more computing devices, a set of historical payment data that comprises a plurality of training pairs, each training pair comprising an example authorization request having a particular combination of values for one or more variable request parameters and an example authorization outcome associated with the example authorization request. The method includes processing each example authorization request with the machine-learned payment success prediction model to receive a respective predicted authorization outcome for each example authorization request. The method includes evaluating a loss function that compares, for each training pair, the respective predicted authorization outcome with the example authorization outcome to obtain a loss value. The method includes modifying one or more parameters of the machine-learned payment success prediction model based at least in part on the loss value provided by the loss function.

Another example aspect of the present disclosure is directed to one or more non-transitory computer-readable media that collectively store a machine-learned payment success prediction model configured to predict outcomes for payment authorization requests. The one or more non-transitory computer-readable media collectively store instructions that, when executed by one or more computer processors, cause the one or more computer processors to perform operations. The operations include obtaining payment data that describes a proposed payment from a customer to a merchant. The operations include identifying a plurality of candidate authorization requests for the proposed payment, each of the plurality of candidate authorization requests having a different combination of values for one or more variable request parameters. The operations include determining, as an output of the machine-learned payment success prediction model, a respective predicted outcome for each of the plurality of candidate authorization requests. The operations include selecting one or more of the plurality of candidate authorization requests as one or more selected authorization requests based at least in part on the respective predicted outcome for each of the plurality of candidate authorization requests output by the machine-learned payment success prediction model.

Another example aspect of the present disclosure is directed to a computing system configured to facilitate authorization of payments. The computing system includes one or more computer processors and one or more non-transitory computer-readable media that collectively store a machine-learned payment success prediction model configured to select authorization request parameters for authorization requests. The one or more non-transitory computer-readable media collective store instructions that, when executed by the one or more computer processors, cause the computing system to perform operations. The operations include obtaining payment data that describes a proposed payment from a customer to a merchant. The operations include determining, as an output of the machine-learned payment success prediction model and based at least in part on the data that describes the proposed payment from the customer to the merchant, one or more values for one or more variable request parameters associated with one or more authorization requests for the proposed payment. The operations include transmitting to a payment processor at least one of the one or more authorization requests having the one or more values for the one or more variable request parameters determined as the output of the machine-learned payment success prediction model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
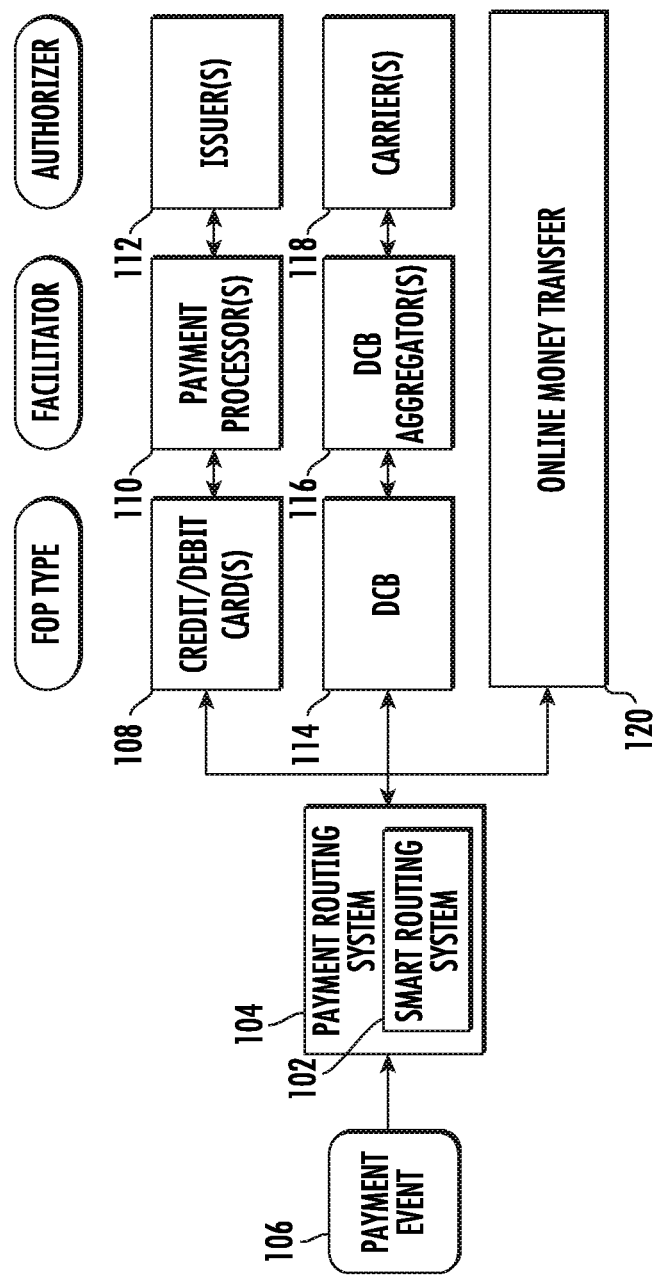
FIG. 1 depicts a block diagram of data flow within an example payment system according to example embodiments of the present disclosure.

Reference numerals that are repeated across plural figures are intended to identify the same features in various implementations.

DETAILED DESCRIPTION

Overview

The present disclosure is directed to computing systems and methods that use machine learning to improve the authorization of payments by payment systems. Specifically, contrary to existing payment authorization approaches which are static in nature, example aspects of the present disclosure are directed to machine learning systems which enable the dynamic and real-time optimization of one or more variable request parameters associated with a payment authorization request. Specifically, example computing systems described herein can employ one or more machine-learned models to assist in the selection of a particular payment processor to which the authorization request is routed, optimization of one or more variable message parameters included in the authorization message (e.g., selection of values for a merchant identification, a merchandise category code, a transaction type, and/or other variable message parameters), and/or automatic generation and/or execution of an automated retry strategy that can be executed if a prior authorization request is declined. The proposed systems and methods have a number of benefits, including improved authorization rates, reduced costs, reduced latency, and reduced losses such as fraud chargebacks and refunds.

As one example, a machine-learned payment success prediction model can be employed to predict a respective success probability for each of a plurality of candidate authorization requests which have different combinations of values for such variable request parameters (e.g., different combinations of payment processor, authorization message values, etc.). The computing system can apply an objective function to evaluate and select one or more of the candidate authorization requests based at least in part on their respective predicted success probabilities. The objective function can also consider other factors such as cost, latency, likelihood of chargeback, etc. The selected authorization request(s) can be transmitted to additional portions of the overall payment system (e.g., to the selected payment processor) to facilitate authorization of the payment. The systems and methods described herein result in improved payment authorization performance, including increased authorization success rate, reduced cost, reduced latency, and reduced instances of losses (e.g., fewer chargebacks, refunds, or the like).

Further, in some implementations, real-time and/or historically observed information associated with various payment processors can be utilized to enable optimization of the variable request parameters in a manner which accounts for the real-time or historically observed information. For example, set(s) of data indicating a respective authorization rate for the payment processor over recent time window(s) such as, for example, the last fifteen minutes, thirty minutes, etc. can be provided as input to the machine-learned payment success prediction model and the payment success prediction model can predict the payment success based on such set(s) of data. In some implementations, multiple types of history can be used in making predictions. Specifically, as examples, the historically observed information can include not just a payment processor's overall history, but their history for the specific kind of payment at issue. As one example, for an example payment for issuing bank X purchasing in currency Y with a prepaid card, the historical data can include information about payments for issuing bank X purchasing in currency Y with a prepaid card and/or payments initiated by the system for credit cards.

As one example benefit, the inclusion and consideration of real-time or historically observed information enables the computing system to detect when a certain payment processor is malfunctioning or otherwise experiencing reduced success rates. In response to such detection, the computing system can proactively re-route authorization requests to alternative payment processors. Thus, in addition to generally improving payment system performance, aspects of the present disclosure also perform real-time detection and mitigation of payment processor outage or malfunction, which is some instances can be referred to as "disaster avoidance." As another example benefit, the real-time or historically observed data can also be used to determine if a previously declined transaction that is on a predetermined future retry schedule should instead be attempted now as a "like" transaction to a transaction that just went through.

The systems and methods of the present disclosure provide a number of technical effects and benefits. In particular, by understanding and optimizing which combination(s) of the variable request parameter(s) are most likely to lead to the best outcome (e.g., as measured by various characteristics such as payment success, cost, latency, losses, and/or the like), the systems and methods of the present disclosure can improve the performance of a payments processing system. For example, the proposed techniques can drastically decrease the number of payment authorization failures, thereby improving customer's experience, boosting merchant's sales and resulting in the conservation of computing resources (e.g., computer processor usage, memory usage, network bandwidth, etc.). More particularly, each authorization request for a payment consumes computing resources (e.g., computer processor usage, memory usage, network bandwidth, etc.) at each of various points in a payment system (e.g., payment processor computing system, credit/debit network computing system, issuer computing system, etc.). When authorization requests are declined, it is typical for the system or system operator (e.g., customer and/or merchant) to "retry" an additional authorization request (which again, if the merchant payment processing approach contains a single payment processor and static message configuration, will likely have the same failed result). Thus, declined authorization requests can directly result in the redundant expenditure of computing resources because the payment system is required to process multiple, redundant instances of authorization requests for a single payment. As such, by reducing the number of declined authorization requests, the systems and methods of the present disclosure can reduce the number of authorization requests performed by the system overall, thereby conserving computing resources (e.g., computer processor usage, memory usage, network bandwidth, etc.) at each of the various points in the payment system.

As another example technical benefit, the proposed systems and methods can take into account fraud losses, cost, latency, and/or the vendor performance when selecting the optimal authorization request. For example, the computing system can apply an objective function to evaluate and select one of a plurality of candidate authorization requests. In addition to a predicted probability of success, the objective function can consider the above-described factors such as cost, latency, likelihood of chargeback, etc. Therefore, the payment processors with the best authorization rates, lowest fees, lowest latency, smallest loss rates, etc. can "earn" more volume over time. This improves both user satisfaction and merchant's sales. In effect, the use of such an objective function can "gamify" or otherwise provide incentives for payment processors or other actors within the payment authorization process to improve their performance (e.g., to reduce cost, latency, associated losses, and/or the like). Specifically, by routing the payment authorization request to one of multiple payment processors based on the objective function, a given payment processor is "rewarded" with additional processing requests if they are able to demonstrate lower costs, latency, and/or losses versus the other payment processors "competing" to process the authorization request. By causing payment processors to compete on characteristics such as authorization rate, cost, latency, losses, and/or the like, customer frustration can be reduced and revenue to merchants can be increased.

Furthermore, a declined authorization request has significant negative downstream consequences and feedback effects (i.e., a declined authorization request has effects beyond just the single request failure and/or prompting of a retry). Specifically, one or more declined authorization requests can trigger additional fraud screening or otherwise stricter analysis from networks and/or issuers, thereby negatively impacting the likelihood of success for future authorization payment requests. As such, by reducing the number of declined authorization requests, the systems and methods of the present disclosure can avoid entering into a negative feedback loop that reduces authorization request approval over a sustained period of time, thereby resulting in significant savings of computing resources over such sustained period of time.

With reference now to the Figures, example embodiments of the present disclosure will be discussed in further detail.

Example Systems and Devices

FIG. 1 depicts a block diagram of data flow within an example payment system according to example embodiments of the present disclosure. The example payment system includes a payment routing system 104. The payment routing system 104 can include a smart routing system 102 that generates an authorization request for a payment event 106. In some implementations, to generate the authorization request, the smart routing system 102 can generate an authorization request message and can select a route for the authorization request message. For example, the routing for the message can identify a payment processor to whom the authorization request message is sent.

The payment event 106 can include a proposed payment from a customer to a merchant. The payment routing system 104 can be associated with and/or operated by the merchant or a third party provider (e.g. a gateway service or a payment processor). Thus, in one example, the payment routing system 104 can receive data describing the payment event 106 from a separate device (e.g., a point of sale device or card reader) operated by the merchant. As an example, the pay As used herein, the terms "customer" and "merchant" should be construed broadly to encompass any scenario in which a first party (e.g., the "customer") wishes to provide (e.g., in exchange for goods and/or services) a payment of monetary value to a second party (e.g., the "merchant"). As examples, a merchant can be a service provider, a biller, a person, or other parties seeking payment for goods and/or services. As another example, the customer and merchant can be two parties in a peer to peer payment arrangement.

The payment routing system 104 can be a standalone device or part of a larger transaction processing system. As one example, the payment routing system 104 can be included in or form a part of a point of sale device or card reader device (e.g., which may be located at the merchant's storefront). As another example, the payment routing system 104 can be part of an e-commerce system that processes online transactions associated with the merchant. In some implementations, the payment routing system 104 can be implemented using one or more server computing devices which communicate (e.g., with a point of sale device) over a network. In some implementations, the payment routing system 104 can include or be embodied by software or other computer-readable instructions which provide a payments routing configuration to be implemented by one or more computing device (e.g., server computing devices and/or point of sale devices).

The payment network illustrated in FIG. 1 includes a number of additional devices and/or entities. For example, for different forms of payment, the payment routing system 104 can communicate with various different systems, depending on the form of payment (as represented under the column "FOP type". As one example, if the form of payment is a credit/debit card 108, the payment routing system 104 can communicate with one or more credit or debit payment processors 110. As another example, if the form of payment is direct carrier billing ("DCB") 114, the payment routing system 104 can communicate with one or more DCB aggregators 116 which can process the payment request. As yet another example, if the form of payment is online money transfer, the payment routing system 104 can communicate with an online money transfer system (e.g., electronic wallet) 120 which can process the payment request. These different systems can be referred to as different "payment networks." These entities can, in turn, communicate with various other upstream and/or downstream systems or entities. For example, the credit/debit card payment processors 110 can engage in, facilitate, and/or intermediate communication between and among the payment routing system 104 and/or one or more issuers 112. As another example, the DCB aggregators 116 can engage in, facilitate, and/or intermediate communication between and among the payment routing system 104 and/or one or more carriers 118. The online money transfer system 120 may have a number of interrelated subsystems that are not explicitly illustrated. Other forms of payment with other routing options may be possible as well.

According to an aspect of the present disclosure, the smart routing system 102 of the payment routing system 104 can enable the dynamic and real-time optimization of one or more variable request parameters associated with a payment authorization request for the payment event 106, which is in contrast to existing payment authorization approaches that are static in nature. In particular, the smart routing system 102 can analyze the individual features within the payment event 106 and, based upon data descriptive of previous performance, select an optimal message configuration and routing option specifically for the payment event 106. For example, selecting the optimal routing for the payment event 106 can include selecting certain systems from among the multiple systems (110, 112, 116, 118, 120) that are available to process the payment.

Optimizing authorization request messages and associated routing logic has a number of benefits, including: improved initial authorization attempt success rates, improved subsequent attempt success rates, and, over time, reduced fees for payment processing (e.g., the payment processors with the best authorization rates, lowest fees, lowest latency, smallest loss rates, etc. can "earn" more volume over time). These benefits improve operational and computing resource usage, while also increasing user satisfaction and improving merchant's sales.

In some implementations of the present disclosure, the smart routing system 102 can include or employ one or more machine-learned models which have been trained to predict certain characteristics of candidate authorization requests generated for the payment event 106. Specifically, the smart routing system 102 can employ one or more machine-learned models to assist in selection of a particular payment processor to which the authorization request is routed, optimization of one or more variable message parameters included in the authorization message (e.g., selection of values for a merchant identification, a merchandise category code, a transaction type, and/or other variable message parameters), and/or automatic generation and/or execution of an automated retry strategy that can be executed if a prior authorization request is declined.

In some implementations, the smart routing system 102 is able to incorporate the results of a previous transaction into future transactions. Thus, the smart routing system 102 can provide a fast and reliable refresh/update capability. Specifically, in determining a subsequent (e.g., "next") payment authorization request, the smart routing system 102 can use the information from the current attempt various ways. As one example, in latency sensitive situations, the smart routing system 102 can reuse all the work done from the first attempt but can intelligently incorporate the new context. As another example, in latency insensitive situations, the smart routing system 102 can re-do all the work for the payment, but with the additional information about its previous failure(s). These capabilities can leverage access to real-time information. For example, the smart routing system 102 can react to immediate changes in payment processor behavior in order to avoid outages. As one example, example implementations of the systems described herein can have a reaction time of 1 minute from start of outage to 50% of traffic being moved away from a payment processor experiencing outages or difficulties.

Figure 2:
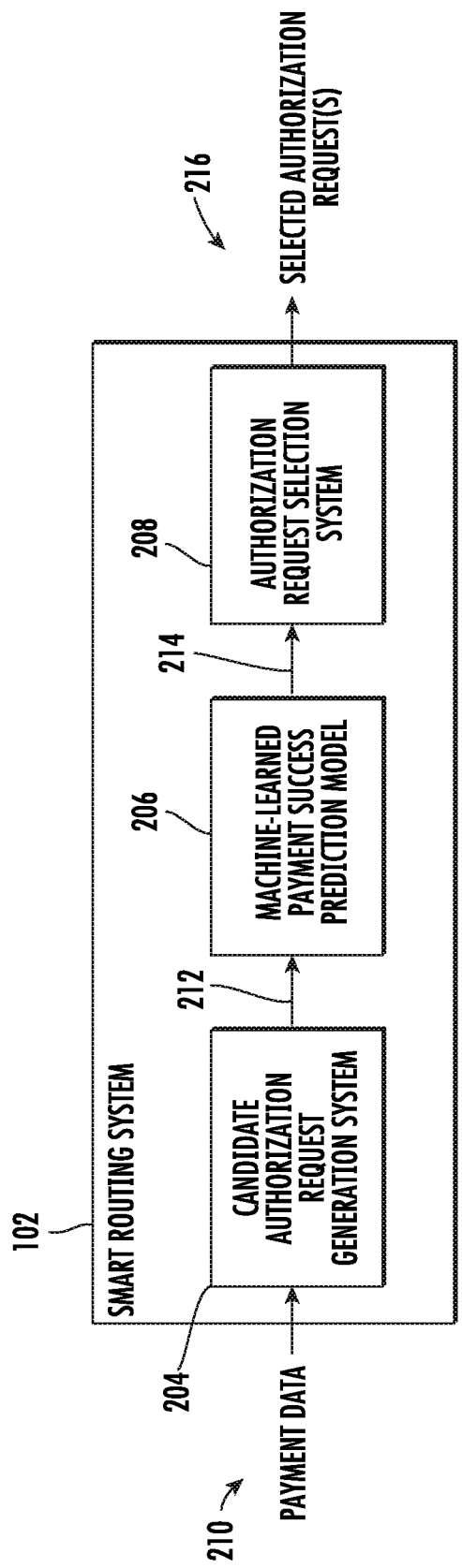
FIG. 2 depicts a block diagram of data flow within a smart routing system according to example embodiments of the present disclosure.

As one example, FIG. 2 depicts a block diagram of data flow within an example smart routing system 102 according to example embodiments of the present disclosure. As illustrated in FIG. 2, the smart routing system 102 can include a candidate authorization request generation system 204, a machine-learned payment success prediction model 206, and an authorization request selection system 208. Each of these systems can be implemented in hardware, firmware, and/or software that controls a computer processor.

The candidate authorization request generation system 204 can obtain a set of payment data (e.g., inclusive of user and/or account information) 210. The payment data 210 can describe a proposed payment from a customer to a merchant. The candidate authorization request generation system 204 can generate a plurality of candidate authorization requests 212 for the proposed payment. Each of the plurality of candidate authorization requests 212 can have a different combination of values for one or more variable request parameters.

As examples, the variable request parameters can include variable message parameters associated with the authorization request message and/or variable routing parameters associated with the routing of the request message. As examples, the variable message parameters can include: a merchant domicile; a merchant ID; a merchandise category code ("MCC") (e.g., digital goods, travel, hardware, music, subscription, utility, etc.); a transaction type (e.g., recurring vs. e-commerce vs one-off); an encryption type or format; customer reputation/value; currency; an expiration date; and/or other portions of the authentication request message. As another example, the variable routing parameters can include a payment processor identification that identifies to which payment processor the authorization request message is routed.

Thus, the candidate authorization request generation system 204 can enumerate a number of different candidate authorization requests 212 that have different combinations of values for these and/or other variable request parameters.

In one example, an enumerative process can be used to enumerate some or all of the possible combinations of values.

As one example, in some implementations, the candidate authorization request generation system 204 can obtain constraint data that describes one or more rules or constraints regarding the one or more variable request parameters. The candidate authorization request generation system 204 can enumerate the plurality of candidate authorization requests 212 that have the different combinations of values for one or more variable request parameters and that satisfy the one or more rules or constraints. In some implementations, the constraints can be manually defined, providing the ability to configure changes in real time and provide guardrails for the overall system. The use of manual constraints can assist in complying with certain legal obligations; can enable the ability to perform various user-defined experiments; can allow for emergency changes to the smart routing system 102 to be quickly implemented; and/or can assist in establishing outage detection thresholds. In some implementations, the constraints can dynamically change over time or as a function of other inputs. In some implementations, the constraints can be specific to and associated with the customer and/or the merchant.

In another example, the candidate authorization requests 212 can be sampled (e.g., randomly) from a distribution of possible values. In yet another example, a population of candidate authorization requests 212 can be carried forward from iteration to iteration and, in some implementations, poorly performing requests can be removed from the population and, for example, replaced by new candidate requests.

Referring again to FIG. 2, the machine-learned payment success prediction model 206 can receive the plurality of candidate authorization requests 212 and can predict a respective success probability 214 for each of candidate authorization request 212. The predicted success probability 214 can be binary or can be a value between 0 and 1. If the predicted probability is a value between 0 and 1, a binary prediction can optionally be obtained through application of a classification threshold.

More generally, the machine-learned payment success prediction model 206 can have been trained to predict success probabilities for payment authorization requests. For example, the machine-learned payment success prediction model can have been trained (e.g., using supervised training techniques) on a set of training data. The training data can include a plurality of training examples, where each training example includes a historical authorization request (e.g., a historical authorization request message and/or its routing characteristics) that has been labeled, annotated, or otherwise associated with a ground-truth authorization outcome (e.g., an indication of whether the corresponding historical authorization request was authorized or declined). Through the training process, the machine-learned payment success prediction model 206 can learn to predict, for a given historical authorization request, a probability that such authorization request was successful (e.g., authorized) (e.g., the model 206 learns to predict a probability that matches the historical authorization outcome). Thus, payment data such as authorization requests and their associated authorization outcomes can be logged over time and can be used to train the machine-learned payment success prediction model 206 to accurately predict a success probability for a particular authorization request.

In another example, the machine-learned payment success prediction model 206 can be trained using a reinforcement learning approach in which, at each of a number of training iterations, the model 206 is provided with a reward that is a function of the authorization outcome for the authorization request predicted by the model 206 (e.g., predicted to have high success probability by the model 206). In such reinforcement learning approach, a policy of the model 206 can be learned based on the reward received over time.

The machine-learned payment success prediction model 206 can be many different types of model. As examples, the machine-learned model can be an artificial neural network, a random forest model, a logistic regression model, or a reinforcement learning agent configured to apply a learned policy.

In some implementations, real-time and/or historically observed information associated with various payment processors (e.g., data indicating an authorization rate for a particular payment processor over recent time window(s) or band(s) such as, for example, the last fifteen minutes, thirty minutes, etc.) can be provided as input to the machine-learned payment success prediction model 206 alongside the candidate authorization requests 212. This inclusion and consideration of real-time or historically observed information enables the machine-learned payment success prediction model 206 to detect when a certain payment processor is malfunctioning or otherwise experiencing reduced success rates. In response to such detection, the machine-learned payment success prediction model 206 can predict a low success probability for requests that will be routed to the payment processor that is malfunctioning or otherwise experiencing reduced success rates. Thus, in addition to generally improving payment system performance, aspects of the present disclosure also perform real-time detection and mitigation of payment processor outage or malfunction, which is some instances can be referred to as "disaster avoidance."

In another example, real-time and/or historically observed information can be used to detect if a message configuration going to a processor is malfunctioning. For example, if an issuing bank has a code push that starts throwing exceptions if MCC=1234, then the smart routing system 102 can learn to stop sending 1234 to that issuing bank regardless of which payment processor is used.

Referring again to FIG. 2, the authorization request selection system 208 can select one or more of the plurality of candidate authorization requests 212 as one or more selected authorization requests 216 based at least in part on the respective success probability 214 for each of the plurality of candidate authorization requests 212 output by the machine-learned payment success prediction model 206. As one example, the authorization request selection system 208 can select some number (e.g., 1, 2, 3, etc.) of the candidate authorization requests 216 that received the largest success probabilities 214.

As another example, the authorization request selection system 208 can evaluate an objective function respectively for each candidate authorization request 212 based at least in part on the respective success probability 214 determined for each candidate authorization request 212 to determine a respective objective function score for each candidate authorization request 212. The objective function can represent or implement a tradeoff between various characteristics of the requests, including success probability. As one example, for each candidate authorization request 212, the objective function can evaluate the predicted success probability 214, an expected cost, an expected loss, and an expected latency. The authorization request selection system 208 can select some number (e.g., 1, 2, 3, etc.) of the candidate authorization requests 216 that received the best objective function scores (e.g., the candidate authorization requests 216 that maximize success probability while minimizing cost, losses, and latency).

In some implementations, the objective function evaluated by the authorization request selection system 208 can be a dynamic objective function that is a function of one or more characteristics of the proposed payment (e.g., as reflected by the payment data 210). As one example, the dynamic objective function can be a function of a payment amount or a merchandise type associated with the proposed payment. For example, for a larger value item (e.g., an expensive laptop) the customer and/or merchant may be willing to trade a longer request latency for lower fees or loss rate while for a lower value item (e.g., a candy bar at a busy convenience store) reducing the request latency may be more important. In another example, relative weights or tradeoffs between the characteristics evaluated by the objective function can be manually tuned by the customer and/or the merchant that is operating the smart routing system 102 (e.g., a particular merchant may be willing to trade payment of higher fees for a larger authorization success rate).

In some implementations, the authorization request system 208 can select multiple authorization requests as selected authorization requests 216. For example, the multiple selected authorization requests 216 can be ranked or otherwise ordered. This can enable an automated retry strategy in which, in the event that an initial authorization request fails, subsequent authorization requests (e.g., with potentially different values for one or more variable request parameters) can automatically be used to seek authorization for the payment.

Thus, the smart routing system 102 can generate one or more selected authorization requests 216 based on payment data 210 that describes a proposed payment. Specifically, as illustrated in FIG. 2, the smart routing system 102 can leverage a machine-learned payment success prediction model to provide a success probability for each of a plurality of candidate authorization requests, and the smart routing system can select from among the candidate authorization requests based at least in part on predicted success probabilities.

In some implementations, rather than using a machine-learned model to predict a success probability for a candidate authorization request, the smart routing system 102 can use a machine-learned authorization request generation model (not illustrated) to directly predict optimal values for one or more variable request parameters of an authorization request. In particular, the machine-learned authorization request generation model can receive the payment data 210 as input and can process the payment data 210 to generate one or more authorization requests (e.g., to predict specific values for variable request parameters such as message values or routing characteristics). The machine-learned authorization request generation model can be trained based on learning function that evaluates a performance (e.g., authorization rate, latency, cost, etc.) of the authorization requests generated by the machine-learned authorization request generation model.

In some implementations, additional machine-learned models can be used to predict other aspects for a candidate authorization request (e.g., in addition or alternatively to predicting success probability). As examples, additional machine-learned model(s) can be trained to predict losses, fees, vendor performance parameters, latency, and/or other relevant information about a particular candidate authorization request.

Figure 3:
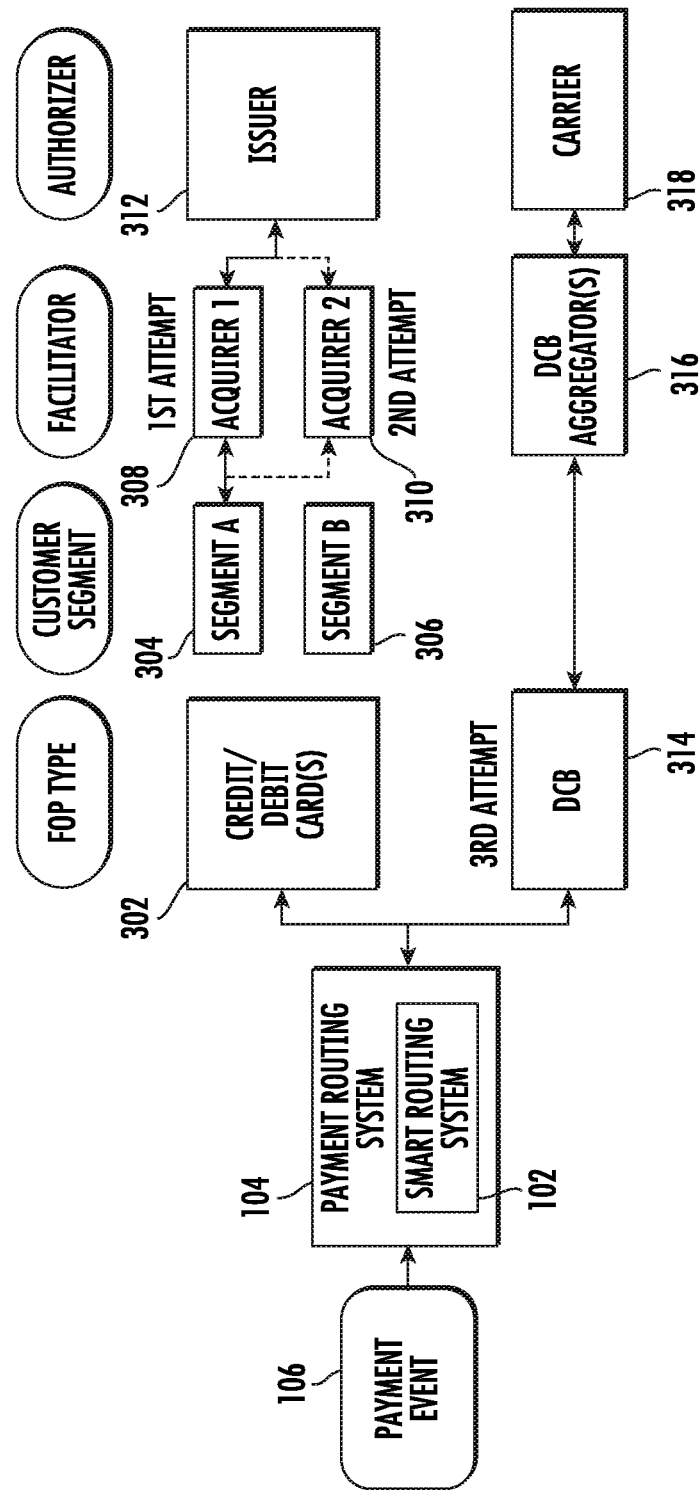
FIG. 3 depicts a block diagram of data flow within an example payment system according to example embodiments of the present disclosure.

Referring now to FIG. 3, FIG. 3 depicts a block diagram of data flow within an example payment system according to example embodiments of the present disclosure. Specifically, FIG. 3 shows an example use of the smart routing system 102 of the payment routing system 104 to generate and implement authorization requests for the payment event 106.

In particular, the smart routing system 102 has selected an initial authorization request that sends the authorization request that uses a debit or credit card 302 form of payment. The initial authorization request can use a merchant ID from segment A (see box 304) rather than a generic merchant ID from segment B (box 306).

For a first attempt, the smart routing system 102 has selected to route the request to a first acquirer 308 and an issuer 312. If the first attempt fails, the smart routing system 102 has also generated a second authorization request that can be used to automatically retry. In particular, for the second attempt, the smart routing system 102 has selected to route the second request to a second acquirer 310 and the issuer 312.

In addition, if the second attempt fails, the smart routing system 102 has also generated a third authorization request that can be used to automatically retry. In particular, for the third attempt, the smart routing system 102 has selected to use a DCB form of payment 314 and to route the third request to a DCB aggregator 316, and a carrier 318.

Figure 4:
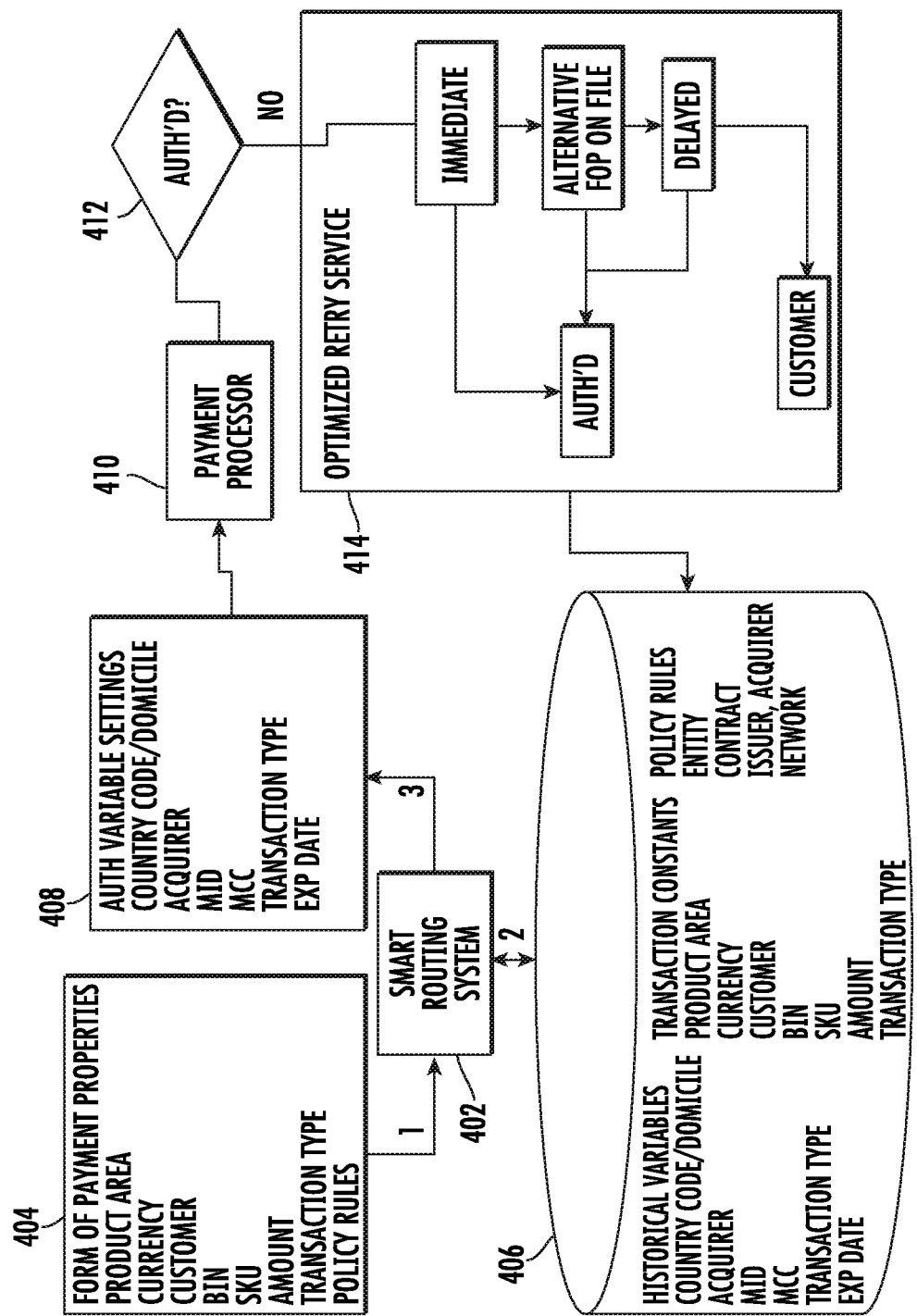
FIG. 4 depicts a block diagram of data flow within an example payment system according to example embodiments of the present disclosure.

FIG. 4 depicts a block diagram of data flow within an example payment system according to example embodiments of the present disclosure. Specifically, FIG. 4 shows a smart routing system 402 generating a set of authorization requests.

At a first stage, the smart routing system 402 obtains a set of transaction constants 404. For example, the transactions constants can include some or all of: product area, currency, customer, BIN, SKU, amount, transaction type. Alternatively, some of these items can be variables rather than constant.

At a second stage, the smart routing system 402 can access a database 406 that contains authorization message, routing information, outcomes of recent similar transactions using each payment processor, and/or other data. Specifically, the database 406 can obtain information about historical variables, transaction constants, policy rules, or other information. The historical variables can include some or all of: country code/domicile, acquirer, merchant ID, MCC, transaction type, expiration date, etc. The database 406 can include acceptable ranges of values for the historical variables. The policy rules can include information about entity, contract, issuer/acquirer, networks, etc.

At a third stage, the smart routing system combines the information from stages 1 and 2 to produce an authentication request that satisfies the policy rules and has particular values for the variable settings. For example, particular values can be provided for some or all of the following variables: country code/domicile, acquirer, merchant ID, MCC, transaction type, EXP date, etc. This is an example list of variables. Other variables can be dynamically optimized as well.

Following the third stage, the smart routing system 402 (or an associated payment routing system) can transmit at least an initial authorization message to a payment processor 410. At 412, the smart routing system 402 (or an associated payment routing system) can determine whether the payment processor 410 authorized the payment. If yes, then the payment can be completed (e.g., according to standard account management protocols). However, if it is determined at 412 that the payment processor 410 did not authorize the payment, then the smart routing system 402 (or an associated payment routing system) can and perform an optimized retry service 414.

In some implementations, the optimized retry service 414 can include an immediate retry in which the same first authentication message is sent to the same payment processor 410. Alternatively, the immediate retry can use a different payment processor. In some implementations, for the immediate retry, to reduce latency, the success probabilities are not updated or otherwise re-predicted. Alternatively, the success probabilities can be updated or re-predicted. If this immediate retry is authorized, then the service 414 ends. In some implementations, no immediate retry is performed.

However, if the immediate retry fails, the optimized retry service 414 can attempt one or more alternative authorization messages. The alternative authorization messages may, in some implementations, use an alternative form of payment which is already on file or otherwise known. The alternative authorization message(s) may also have different values for variable message parameters and/or may have a different routing (e.g., may be sent to a payment processor). In some implementations, a delay period can be observed between backup authorization request attempts. For example, the delay period can account for and optimize the request time in view of learned information about certain times of day, days of week, etc. at which authorization rates are higher.

If one of the backup authorization request attempt(s) is successful, then the service 414 ends. If none of the backup authorization request attempt(s) are successful, then an error message can be provided to the customer and/or the transaction can be indicated as declined. Depending on the error message received from the issuer, the system can notify the customer about steps required to resolve the decline.

In some implementations, the payment routing system can continuously send a small number of transactions to merchant IDs and/or perform experiments. More generally, another aspect of the present disclosure is directed to a merchant ID priming process that resolves the following issue: When a new merchant ID is seen by an issuer, it is considered higher risk and may experience higher declines. To remedy this, the smart routing systems described herein can periodically expose each active merchant ID to at least some minimal number of transactions. Then, when a relatively larger amount of traffic is ready to use the merchant ID, it will not be considered "new" and, therefore, the merchant ID will have a superior authentication rate. As one example, the smart routing system can monitor a state of each active merchant ID. When the state reaches a certain predefined state associated with reduced traffic, the smart router can perform the priming process for such merchant ID (e.g., via the creation of an experiment that exposes the merchant ID to some portion of traffic).

Figure 5A:
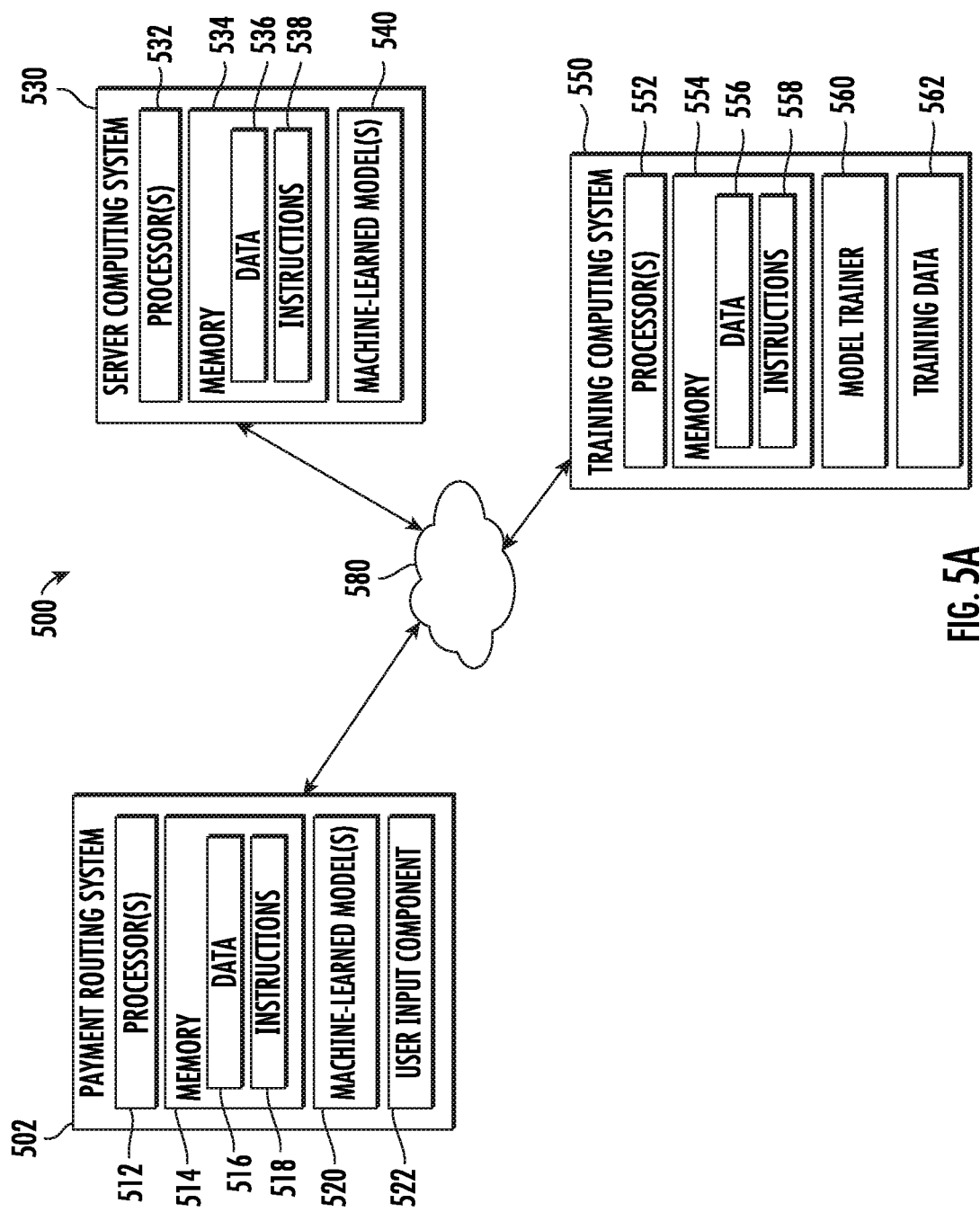
FIG. 5A depicts a block diagram of an example computing system according to example embodiments of the present disclosure.

FIG. 5A depicts a block diagram of an example computing system 500 according to example embodiments of the present disclosure. The system 500 includes a payment routing system 502, a server computing system 530, and a training computing system 550 that are communicatively coupled over a network 580.

The payment routing system 502 can be any type of computing device, such as, for example, a point of sale device or card reader, a personal computing device (e.g., laptop or desktop), a mobile computing device (e.g., smartphone or tablet), a gaming console or controller, a wearable computing device, an embedded computing device, one or more server computing devices, or any other type of computing device. The payment routing system 502 can implement or execute a payments routing configuration which, for example, may be included in or embodied by a set of software programs or instructions.

The payment routing system 502 includes one or more computer processors 512 and a memory 514. The one or more computer processors 512 can be any suitable processing device (e.g., a computer processor core, a microprocessor, an ASIC, a FPGA, a controller, a microcontroller, etc.) and can be one computer processor or a plurality of computer processors that are operatively connected. The memory 514 can include one or more non-transitory computer-readable storage mediums, such as RAM, ROM, EEPROM, EPROM, flash memory devices, magnetic disks, etc., and combinations thereof. The memory 514 can store data 515 and instructions 518 which are executed by the computer processor 512 to cause the payment routing system 502 to perform operations.

In some implementations, the payment routing system 502 can store or include one or more machine-learned models 520. For example, the machine-learned models 520 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 520 are discussed with reference to FIG. 2.

In some implementations, the one or more machine-learned models 520 can be received from the server computing system 530 over network 580, stored in the user computing device memory 514, and then used or otherwise implemented by the one or more computer processors 512. In some implementations, the payment routing system 502 can implement multiple parallel instances of a single machine-learned model 520 (e.g., to perform parallel payment routing across multiple instances of payments).

Additionally or alternatively, one or more machine-learned models 540 can be included in or otherwise stored and implemented by the server computing system 530 that communicates with the payment routing system 502 according to a client-server relationship. For example, the machine-learned models 540 can be implemented by the server computing system 540 as a portion of a web service (e.g., a payment routing service). Thus, one or more models 520 can be stored and implemented at the payment routing system 502 and/or one or more models 540 can be stored and implemented at the server computing system 530.

The payment routing system 502 can also include one or more user input component 522 that receives user input. For example, the user input component 522 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 530 includes one or more computer processors 532 and a memory 534. The one or more computer processors 532 can be any suitable processing device (e.g., a computer processor core, a microprocessor, an ASIC, a FPGA, a controller, a microcontroller, etc.) and can be one computer processor or a plurality of computer processors that are operatively connected. The memory 534 can include one or more non-transitory computer-readable storage mediums, such as RAM, ROM, EEPROM, EPROM, flash memory devices, magnetic disks, etc., and combinations thereof. The memory 534 can store data 536 and instructions 538 which are executed by the computer processor 532 to cause the server computing system 530 to perform operations.

In some implementations, the server computing system 530 includes or is otherwise implemented by one or more server computing devices. In instances in which the server computing system 530 includes plural server computing devices, such server computing devices can operate according to sequential computing architectures, parallel computing architectures, or some combination thereof.

As described above, the server computing system 530 can store or otherwise include one or more machine-learned models 540. For example, the models 540 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 540 are discussed with reference to FIG. 2.

The payment routing system 502 and/or the server computing system 530 can train the models 520 and/or 540 via interaction with the training computing system 550 that is communicatively coupled over the network 580. The training computing system 550 can be separate from the server computing system 530 or can be a portion of the server computing system 530.

The training computing system 550 includes one or more computer processors 552 and a memory 554. The one or more computer processors 552 can be any suitable processing device (e.g., a computer processor core, a microprocessor, an ASIC, a FPGA, a controller, a microcontroller, etc.) and can be one computer processor or a plurality of computer processors that are operatively connected. The memory 554 can include one or more non-transitory computer-readable storage mediums, such as RAM, ROM, EEPROM, EPROM, flash memory devices, magnetic disks, etc., and combinations thereof. The memory 554 can store data 556 and instructions 558 which are executed by the computer processor 552 to cause the training computing system 550 to perform operations. In some implementations, the training computing system 550 includes or is otherwise implemented by one or more server computing devices.

The training computing system 550 can include a model trainer 560 that trains the machine-learned models 520 and/or 540 stored at the payment routing system 502 and/or the server computing system 530 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 560 can perform a number of generalization techniques (e.g., weight decays, dropouts, etc.) to improve the generalization capability of the models being trained.

In particular, the model trainer 560 can train the machine-learned models 520 and/or 540 based on a set of training data 562. The training data 562 can include, for example, a plurality of training examples, where each training example includes a historical authorization request (e.g., a historical authorization request message and/or its routing characteristics) that has been labeled, annotated, or otherwise associated with a ground-truth authorization outcome (e.g., an indication of whether the corresponding historical authorization request was authorized or declined). Through the training process, the machine-learned model(s) can learn to predict, for a given historical authorization request, a probability that such authorization request was successful (e.g., authorized) (e.g., the model learns to predict a probability that matches the historical authorization outcome). Thus, payment data such as authorization requests and their associated authorization outcomes can be logged over time and can be used to train the machine-learned model(s) to accurately predict a success probability for a particular authorization request. In another example, each training data example can include a set of input payments data and a ground truth set of values for one or more variable authorization request parameters. In some implementations, the training data 562 can be collected and applied in an "online fashion." For example, the model(s) can learn based on feedback that indicates the outcome of the authorization request(s) used as a result of the model(s) prediction(s).

In some implementations, if the user has provided consent, the training examples can be provided by the payment routing system 502. Thus, in such implementations, the model 520 provided to the payment routing system 502 can be trained by the training computing system 550 on user-specific data received from the payment routing system 502. In some instances, this process can be referred to as personalizing the model.

The model trainer 560 includes computer logic utilized to provide desired functionality. The model trainer 560 can be implemented in hardware, firmware, and/or software controlling a general purpose computer processor. For example, in some implementations, the model trainer 560 includes program files stored on a storage device, loaded into a memory and executed by one or more computer processors. In other implementations, the model trainer 560 includes one or more sets of computer-executable instructions that are stored in a tangible computer-readable storage medium such as RAM hard disk or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the payment routing system 502 can include the model trainer 560 and the training dataset 562. In such implementations, the models 520 can be both trained and used locally at the payment routing system 502. In some of such implementations, the payment routing system 502 can implement the model trainer 560 to personalize the models 520 based on user-specific data.

Figure 5B:
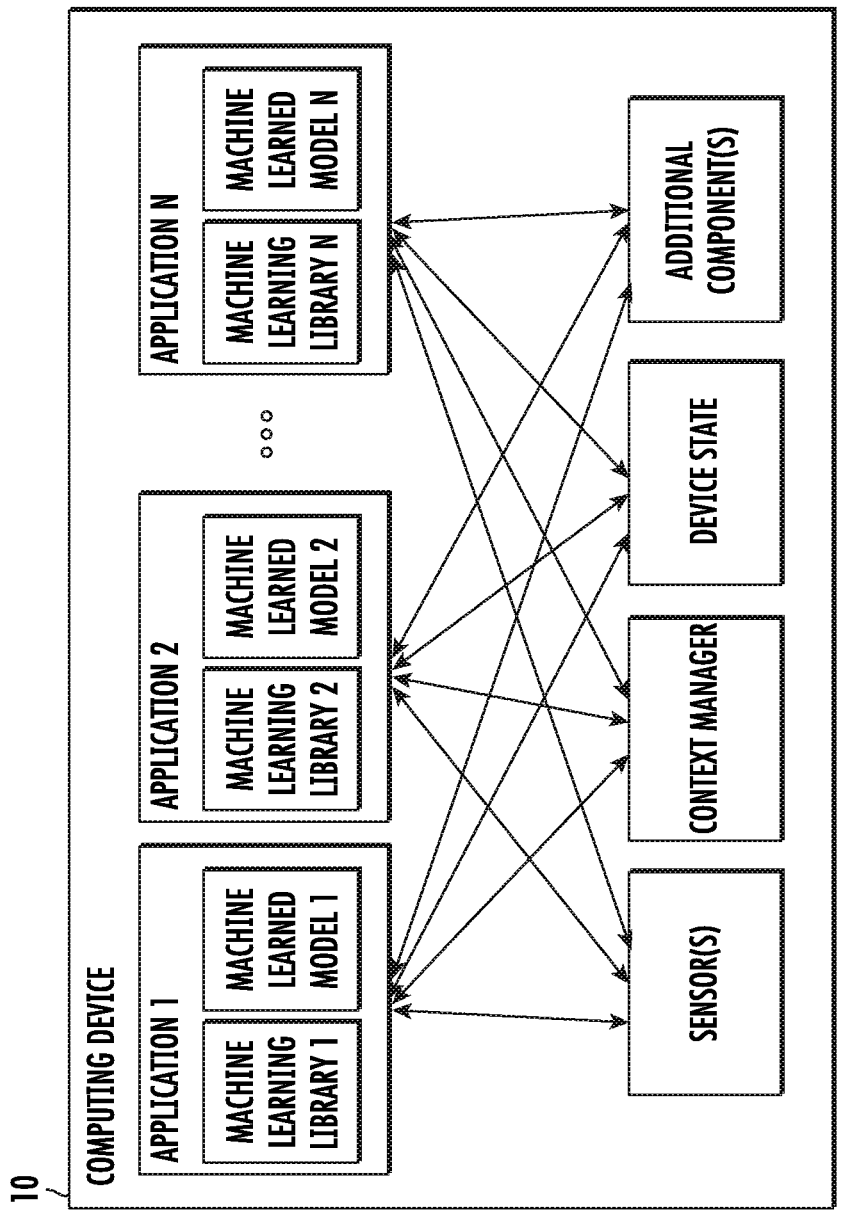
FIG. 5B depicts a block diagram of an example computing device according to example embodiments of the present disclosure.

FIG. 5B depicts a block diagram of an example computing device 10 that performs according to example embodiments of the present disclosure. The computing device 10 can be a payments processing device (e.g., user computing device) or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
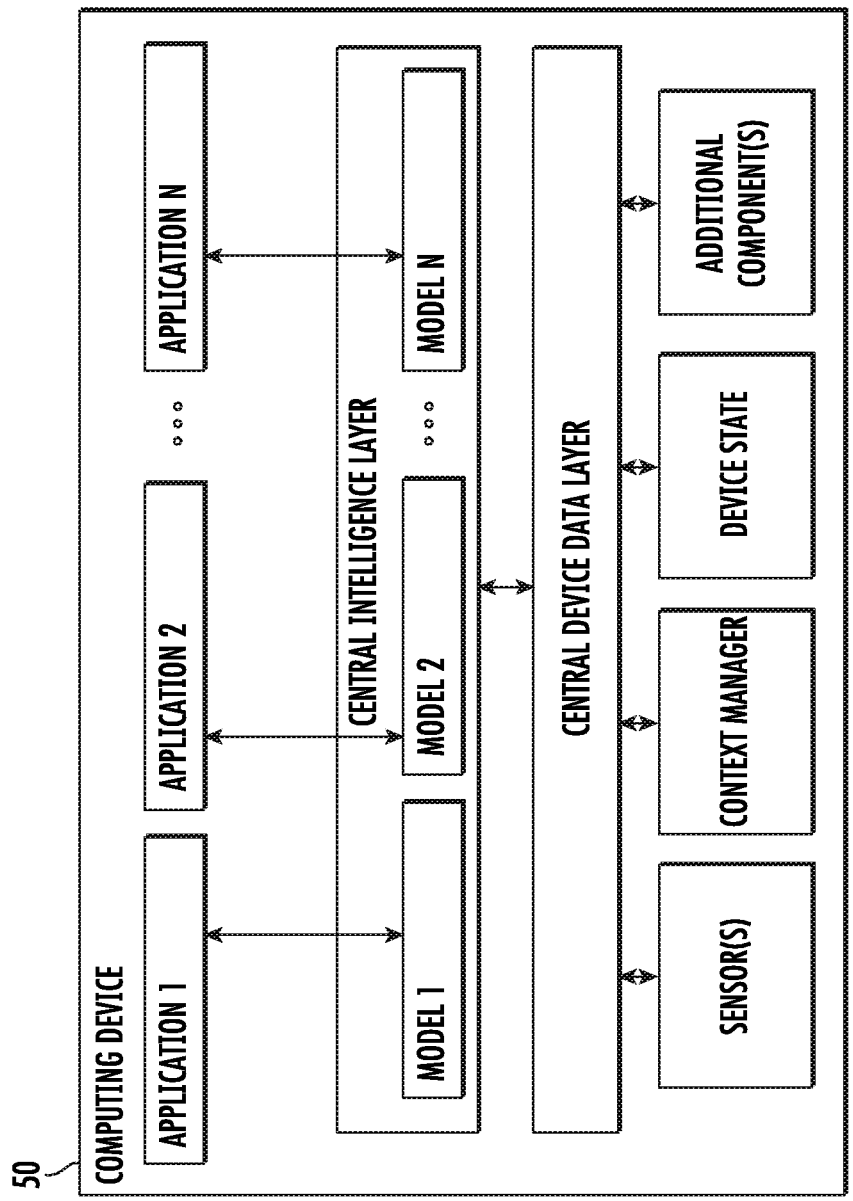
FIG. 5C depicts a block diagram of an example computing device according to example embodiments of the present disclosure.

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 6:
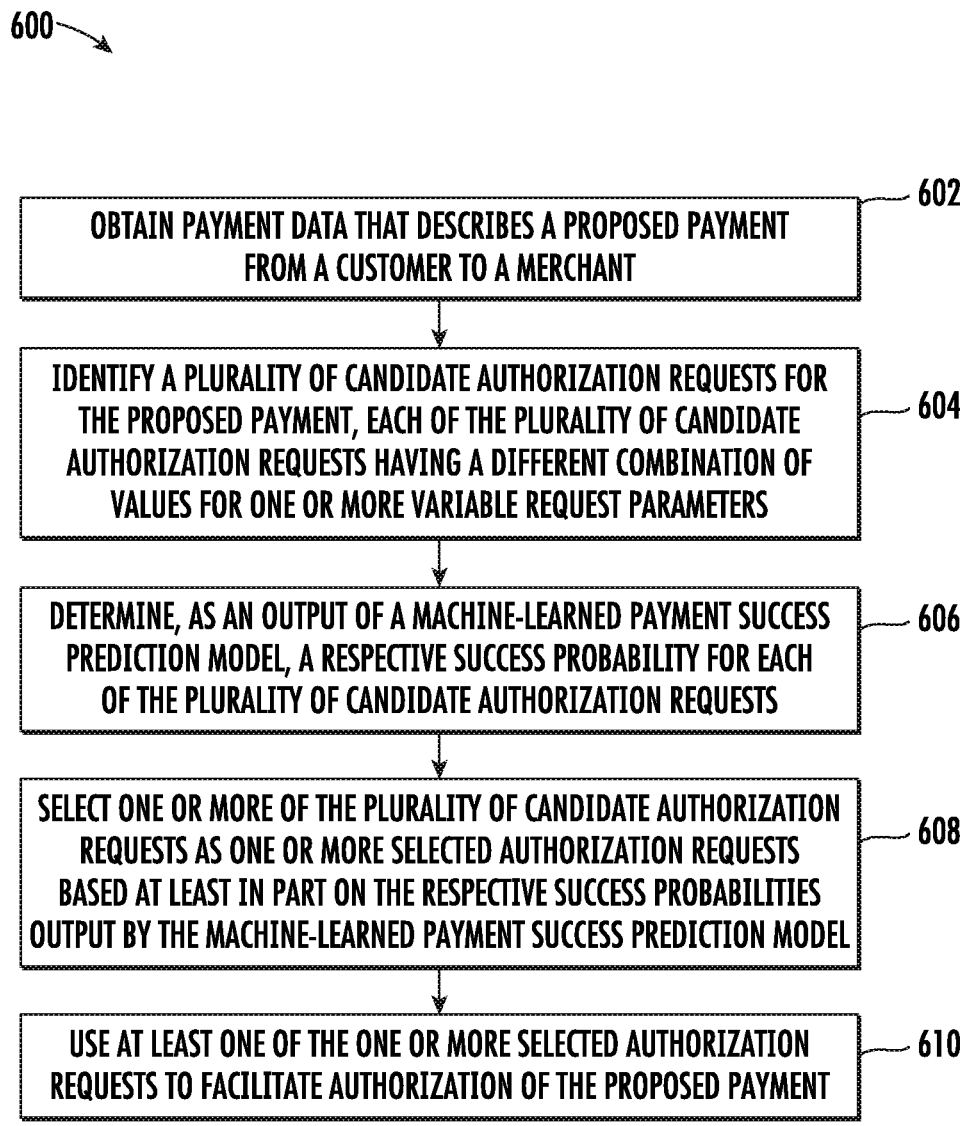
FIG. 6 depicts a flow chart diagram of an example method to route payment authorization requests according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain payment data that describes a proposed payment from a customer to a merchant.

At 604, the computing system can identify a plurality of candidate authorization requests for the proposed payment. Each of the plurality of candidate authorization requests can have a different combination of values for one or more variable request parameters.

In some implementations, the plurality of candidate authorization requests respectively can include a plurality of candidate authorization messages. The one or more variable request parameters can include one or more variable message parameters. In some implementations, the one or more variable message parameters can include one or more of: a merchant domicile; a merchant identification; a merchandise category code; a transaction type; and an expiration date.

In some implementations, the one or more variable request parameters can include a payment processor identification. At least two of the plurality of candidate authorization requests can respectively identify at least two different candidate payment processors.

In some implementations, identifying the plurality of candidate authorization requests for the proposed payment can include: obtaining constraint data that describes one or more constraints regarding the one or more variable request parameters; and enumerating the plurality of candidate authorization requests that have the different combinations of values for one or more variable request parameters and that satisfy the one or more constraints.

At 606, the computing system can determine, as an output of a machine-learned payment success prediction model, a respective success probability for each of the plurality of candidate authorization requests.

In some implementations, determining, as the output of the machine-learned payment success prediction model, the respective success probability for each of the plurality of candidate authorization requests can include: inputting, into the machine-learned payment success prediction model, data descriptive of the plurality of candidate authorization requests and data descriptive of one or more recent payment authorization outcomes; and processing, using the machine-learned payment success prediction model, the data descriptive of the plurality of candidate authorization requests and the data descriptive of the one or more recent payment authorization outcomes to produce the respective success probability for each of the plurality of candidate authorization requests. In some implementations, the data descriptive of the one or more recent payment authorization outcomes can include, for each of one or more candidate payment processors, data indicative of an authorization success rate over one or more time windows or bands.

In some implementations, the machine-learned payment success prediction model has been trained on a set of historical payment data that comprises a plurality of training pairs. Each training pair can include an example authorization request having a particular combination of values for the one or more variable request parameters and an example authorization outcome associated with the example authorization request. In some implementations, each training pair can further include data indicative of a time at which the example authorization outcome was experienced. The historical payment data can be organized into a plurality of groups based on the data indicative of the time at which the example authorization outcome was experienced.

At 608, the computing system can select one or more of the plurality of candidate authorization requests as one or more selected authorization requests based at least in part on the respective success probabilities output by the machine-learned payment success prediction model.

In some implementations, selecting the one or more of the plurality of candidate authorization requests as selected authorization requests can include: evaluating an objective function respectively for each candidate authorization request based at least in part on the respective success probability determined for each candidate authorization request to determine a respective objective function score for each candidate authorization request; and selecting the one or more of the plurality of candidate authorization requests based at least in part on the objective function scores determined for the candidate authorization requests. In some implementations, the objective function can evaluate, for each candidate authorization request, a predicted success probability, an expected cost, an expected loss, and an expected latency.

In some implementations, the objective function can be a dynamic objective function that is a function of one or more characteristics of the proposed payment. As an example, the dynamic objective function can be a function of a payment magnitude or a merchandise type associated with the proposed payment.

In some implementations, selecting the one or more of the plurality of candidate authorization requests as selected authorization requests comprises selecting a sequence of authorization requests for inclusion in an automatic retry schedule.

At 610, the computing system can use at least one of the one or more selected authorization requests to facilitate authorization of the proposed payment. For example, using the selected authorization request(s) to facilitate authorization can include transmitting at least one of the one or more selected authorization requests to a payment processor.

In some implementations, after 610, the method 600 can further include obtaining authorization data descriptive of an authorization outcome associated with the one or more selected authorization requests; and re-training the machine-learned payment success prediction model based at least in part on the authorization outcome associated with the one or more selected authorization requests.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system configured to facilitate authorization of payments, the computing system comprising:
one or more computer processors; and
one or more non-transitory computer-readable media that collectively store:
a machine-learned payment success prediction model configured to predict success probabilities for payment authorization requests; and
instructions that, when executed by the one or more computer processors, cause the computing system to perform operations, the operations comprising:
obtaining payment data that describes a proposed payment from a customer to a merchant, the proposed payment including a first form of payment;
generating a plurality of candidate authorization requests for the proposed payment including the first form of payment, each of the plurality of candidate authorization requests having a different combination of values for one or more variable request parameters, wherein at least one of the one or more variable request parameters includes a merchant identification and two or more of the plurality of candidate authorization requests respectively include different values for the merchant identification of a same merchant;
determining, as an output of the machine-learned payment success prediction model, a respective success probability for each of the plurality of candidate authorization requests for the proposed payment; and
selecting one or more of the plurality of candidate authorization requests as one or more selected authorization requests for the proposed payment based at least in part on the respective success probability for each of the plurality of candidate authorization requests output by the machine-learned payment success prediction model.

2. The computing system of claim 1, wherein determining, as the output of the machine-learned payment success prediction model, the respective success probability for each of the plurality of candidate authorization requests comprises:
inputting, into the machine-learned payment success prediction model, data descriptive of the plurality of candidate authorization requests and data descriptive of one or more recent payment authorization outcomes; and
processing, using the machine-learned payment success prediction model, the data descriptive of the plurality of candidate authorization requests and the data descriptive of the one or more recent payment authorization outcomes to produce the respective success probability for each of the plurality of candidate authorization requests.

3. The computing system of claim 2, wherein the data descriptive of the one or more recent payment authorization outcomes comprises, for each of one or more candidate payment processors, data indicative of an authorization success rate over one or more time windows.

4. The computing system of claim 1, wherein the operations further comprise transmitting at least one of the one or more selected authorization requests to a payment processor.

5. The computing system of claim 1, wherein the plurality of candidate authorization requests respectively comprise a plurality of candidate authorization messages, and wherein the one or more variable request parameters comprise one or more variable message parameters.

6. The computing system of claim 5, wherein the one or more variable message parameters comprise one or more of:
a merchant domicile;
a merchandise category code;
a transaction type; and
an expiration date.

7. The computing system of claim 1, wherein the one or more variable request parameters comprise a payment processor identification, and wherein at least two of the plurality of candidate authorization requests respectively identify at least two different candidate payment processors.

8. The computing system of claim 1, wherein identifying the plurality of candidate authorization requests for the proposed payment comprises:
obtaining constraint data that describes one or more constraints regarding the one or more variable request parameters; and
enumerating the plurality of candidate authorization requests that have the different combinations of values for one or more variable request parameters and that satisfy the one or more constraints.

9. The computing system of claim 1, wherein selecting the one or more of the plurality of candidate authorization requests as selected authorization requests comprises:
evaluating an objective function respectively for each candidate authorization request based at least in part on the respective success probability determined for each candidate authorization request to determine a respective objective function score for each candidate authorization request; and
selecting the one or more of the plurality of candidate authorization requests based at least in part on the objective function scores determined for the candidate authorization requests.

10. The computing system of claim 9, wherein the objective function evaluates, for each candidate authorization request, a predicted success probability, an expected cost, an expected loss, and an expected latency.

11. The computing system of claim 9, wherein the objective function comprises a dynamic objective function that is a function of one or more characteristics of the proposed payment.

12. The computing system of claim 11, wherein the dynamic objective function is a function of a payment magnitude or a merchandise type associated with the proposed payment.

13. The computing system of claim 1, wherein selecting the one or more of the plurality of candidate authorization requests as selected authorization requests comprises selecting a sequence of authorization requests for inclusion in an automatic retry schedule.

14. The computing system of claim 1, wherein the computing system consists of a point of sale device that includes the one or more computer processors and the one or more non-transitory computer-readable media.

15. The computing system of claim 1, wherein the machine-learned payment success prediction model has been trained on a set of historical payment data that comprises a plurality of training pairs, each training pair comprising an example authorization request having a particular combination of values for the one or more variable request parameters and an example authorization outcome associated with the example authorization request.

16. The computing system of claim 15, wherein each training pair further comprises data indicative of a time at which the example authorization outcome was experienced, and wherein the historical payment data is organized into a plurality of groups based on the data indicative of the time at which the example authorization outcome was experienced.

17. The computing system of claim 1, wherein the operations further comprise:
obtaining authorization data descriptive of an authorization outcome associated with the one or more selected authorization requests; and
re-training the machine-learned payment success prediction model based at least in part on the authorization outcome associated with the one or more selected authorization requests.

18. The computing system of claim 1, wherein the machine-learned payment success prediction model comprises:
a reinforcement learning agent configured to apply a learned policy;
a logistic regression model;
a random forest model; or
an artificial neural network.

19. One or more non-transitory computer-readable media that collectively store:
a machine-learned payment success prediction model configured to predict outcomes for payment authorization requests; and
instructions that, when executed by one or more computer processors, cause the one or more computer processors to perform operations, the operations comprising:
obtaining payment data that describes a proposed payment from a customer to a merchant, the proposed payment including a first form of payment;
generating a plurality of candidate authorization requests for the proposed payment including the first form of payment, each of the plurality of candidate authorization requests having a different combination of values for one or more variable request parameters, wherein at least one of the one or more variable request parameters includes a merchant identification and two or more of the plurality of candidate authorization requests respectively include different values for the merchant identification of a same merchant;
determining, as an output of the machine-learned payment success prediction model, a respective predicted outcome for each of the plurality of candidate authorization requests for the proposed payment; and
selecting one or more of the plurality of candidate authorization requests as one or more selected authorization requests for the proposed payment based at least in part on the respective predicted outcome for each of the plurality of candidate authorization requests output by the machine-learned payment success prediction model.

20. A computing system configured to facilitate authorization of payments, the computing system comprising:
one or more computer processors; and
one or more non-transitory computer-readable media that collectively store:
a machine-learned payment success prediction model configured to select authorization request parameters for authorization requests; and
instructions that, when executed by the one or more computer processors, cause the computing system to perform operations, the operations comprising:
obtaining payment data that describes a proposed payment from a customer to a merchant, the proposed payment including a first form of payment;
generating a plurality of candidate authorization requests for the proposed payment including the first form of payment, each of the plurality of candidate authorization requests having a different combination of values for one or more variable request parameters, wherein at least one of the one or more variable request parameters includes a merchant identification and two or more of the plurality of candidate authorization requests respectively include different values for the merchant identification of a same merchant;
determining, as an output of the machine-learned payment success prediction model, a respective success probability for each of the plurality of authorization requests for the proposed payment; and
selecting one or more of the plurality of candidate authorization requests as one or more selected authorization requests for the proposed payment based at least in part on the respective success probability for each of the plurality of candidate authorization requests output by the machine-learned payment success prediction model.

* * * * *